Jan. 13, 1931.  W. J. MILLER  1,788,402
POTTERY FORMING MACHINE
Filed Oct. 13, 1927   2 Sheets-Sheet 2
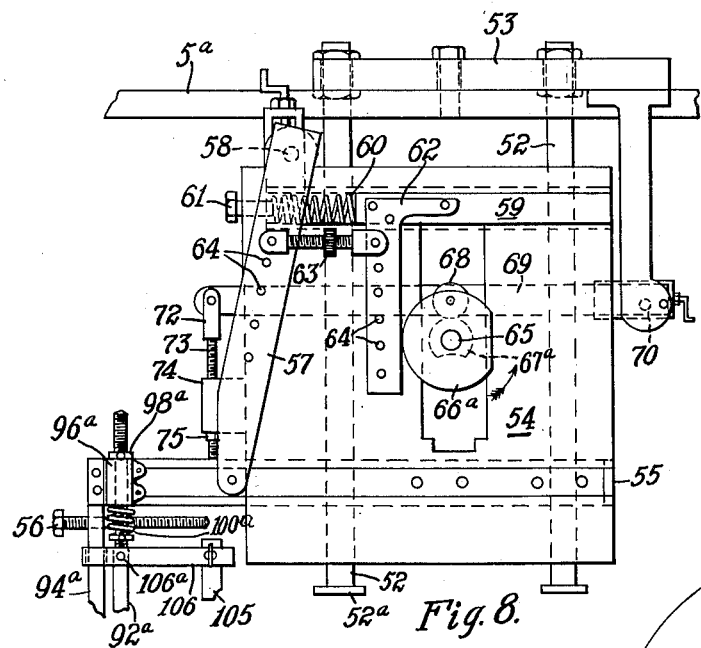
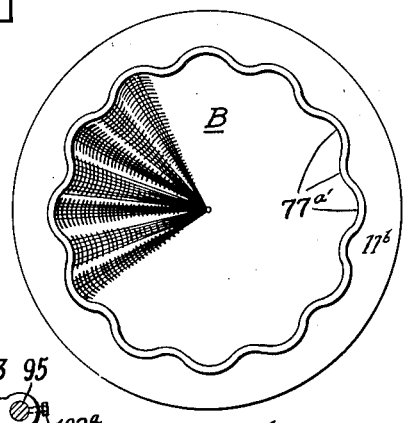
Fig. 4.
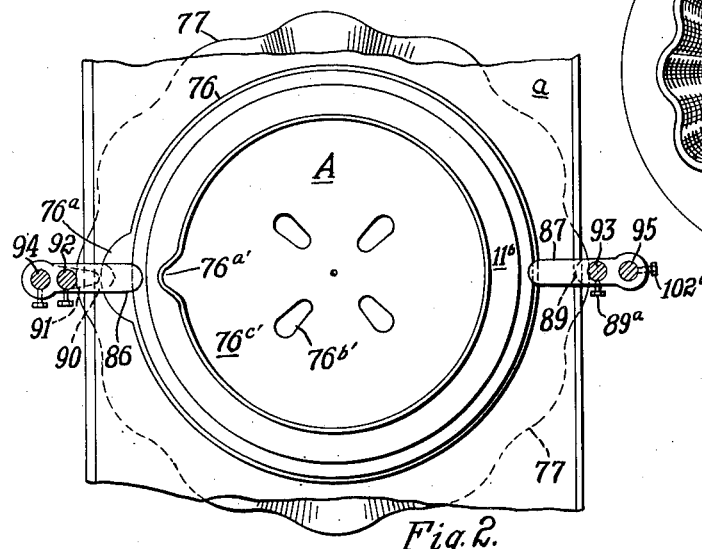
Fig. 2.
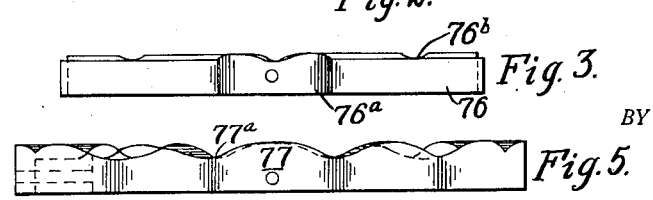
INVENTOR.
William J. Miller.
BY K. G. Doub
ATTORNEY.

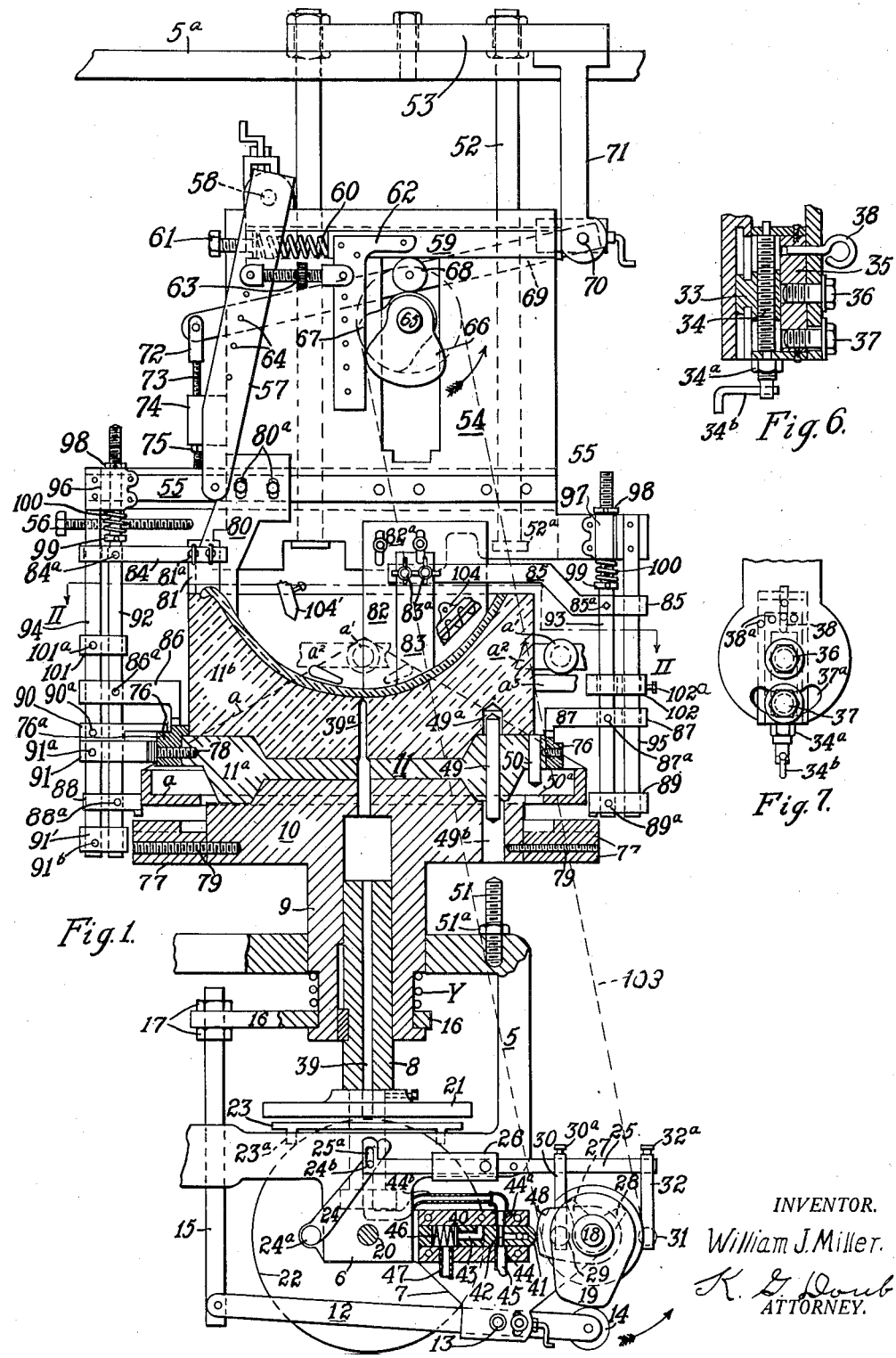

Patented Jan. 13, 1931

1,788,402

UNITED STATES PATENT OFFICE

WILLIAM J. MILLER, OF SWISSVALE, PENNSYLVANIA

POTTERY-FORMING MACHINE

Application filed October 13, 1927. Serial No. 225,992.

This invention relates to pottery forming machines, and one object of the same is to provide means for automatically forming or profiling oval and irregular-shaped ware such, for example, as ware having pouring spouts similar to cream pitchers and fancy ware such, for example, as vases and bowls having flutes and ribs on the interior as well as exterior surface thereof.

Another object of the invention is to provide a positive spotting means for the molds on the chucks and also on the carriers, trays or other conveying members in the event the latter are employed for carrying the molds when not supported on the chucks.

Another object of the invention is to provide means in conjunction with a rotating chuck and (or) mold for imparting universal movement to a profile or forming tool and accurately guiding the latter during such movement, and at the same time maintaining the relative position of the charge in or on the mold and the mold on the chuck constant or in positive association, one with another.

Another object of the invention is to provide means for definitely spotting the angular position of the molds prior to the profiling or other operation, and when the mold is lowered onto the carrier or tray upon the completion of such operation, to again definitely spot and maintain the angular position of the mold preparatory to further operations on the ware in or on the mold.

Another object of the invention is to provide means associated with the mold for controlling the shape or contour of the ware in or on that particular mold, to thereby produce or form ware in succession on the same chuck having different contours.

Another object of the invention is to provide a means for causing a plurality of forming or shaping tools to operate simultaneously on the ware in a rotatable mold and at the same time impart independent distinctive movements to each tool in synchronism with the rotation of the mold, each tool controlling the shape of a particular portion of the ware undergoing the process of formation.

Another object of the invention is to provide means in pottery fabricating mechanism, wherein the molds are conveyed forwardly on carriers in operative adjacency to said mechanism, for definitely spotting the angular, horizontal and vertical position of the molds, to thereby ensure coordination of successive fabricating tools with irregularities that may be formed in the ware during previous fabricating operations.

Still another object of the invention is to provide means associated with a mold for imparting a particular shape or contour to the ware in or on said mold and means associated with the chuck for imparting the same or different shapes to the ware in or on any number of molds, and shaping-tool-guiding devices adjustable to cooperate with either or both of said first and (or) second-named means, thus providing for the production of a different shaped article of ware in a group of standard shaped articles without changing the adjusted position of said devices, and by selectively adjusting said devices, permitting selection from a multiple of designs or configurations of the particular shape desired to be imparted to the ware without changing profiles or shaping tools.

With the foregoing and other objects and advantages in view, the invention consists in the preferred construction and arrangement of the several parts which will be more fully hereinafter described and claimed.

In the drawings:—

Figure 1 is a view in section and side elevation of a pottery machine embodying the features of the invention;

Fig. 2 is a horizontal sectional plan view, parts being omitted, taken on the line 2—2, Fig. 1;

Fig. 3 is a detail view in side elevation of a shaping tool guiding cam member adapted to primarily actuate the shaping tools to form the ware illustrated in Figs. 1 and 2;

Fig. 4 is a plan view of a mold containing an article of ware which is shown as an example of the work which may be automatically performed by the machine;

Fig. 5 is a view similar to Fig. 3 of a shaping tool guiding cam member adapted to primarily actuate the shaping tools to form the ware illustrated in Fig. 4;

Fig. 6 is a detail sectional plan view of a preferred form of adjustment structure;

Fig. 7 is a side elevation of the same; and

Fig. 8 is a view in side elevation of the upper frame assembly shown by Fig. 1, illustrating a preferred method of mounting the trimmer.

The invention is illustrated in the present instance in operative association with a reciprocable and rotatable chuck and cooperating parts which may be understood by referring to my copending applications Serial No. 166,180, filed Feb. 5, 1927, which has become Patent No. 1,655,431, dated Jan. 10, 1928, and Serial No. 170,613, filed Feb. 24, 1927, and a brief description thereof should suffice.

The numeral 5 generally designates the main stationary frame of the machine, which is formed with a bottom housing 6 and an extension bracket 7, a spindle 8 terminating and having bearing and limited vertical movement at its lower extremity in said housing, it being preferred in this respect to adopt the construction illustrated and described in Patent No. 1,655,431 above noted. The spindle 8 is in longitudinal spline-sliding engagement with a hollow spindle 9, terminating in a chuck 10, adapted to intermittently support a mold generally designated at 11 and preferably comprising a metal base 11ª and plaster body portion 11ᵇ.

Reciprocation may be imparted to the chuck and mold as by a lever 12, fulcrumed at 13 on the extension bracket 7, a roller 14 being rotatably mounted on one extremity of said lever and a pitman 15 pivoted to the opposite extremity thereof, the upper extremity of said pitman having adjustably mounted thereon a cross fork 16 as by nuts 17, said cross fork engaging a necked or annular grooved portion of the chuck spindle 9. A shaft 18 is rotatably mounted in the extension bracket 7, a cam 19 being adjustably secured on said shaft and contacting with the roller 14. A further shaft 20 is provided and extends through and has bearing in the lower portion of the housing 6 and coacting friction gears or disks 21 and 22 respectively adjustably secured on the spindle 8 and on said shaft. The shafts 18 and 20 may be driven independently but it is preferred to connect these shafts by suitable flexible members and sprockets or pulleys and drive same in synchronism.

A brake shoe 23 is mounted on the frame 5 under friction gear 21 as by pins 23ª and has a limited vertical sliding movement intermittently imparted thereto as by coacting lever 24 and slide bar or lever 25, said lever 24 being pivotally mounted on the housing 6 as at 24ª and provided with a pin 24ᵇ engaging in a slot 25ª formed in slide bar 25, said latter bar having limited lateral sliding movement in and being supported by a bracket 26, which may be formed integral with, or suitably secured to, the frame 5. Slide bar or lever 25 is actuated by brake cams 27 and 28, indicated in dotted lines, which are adjustably secured on shaft 18, cam 27 intermittently contacting with a roller 29 mounted on a finger 30, the latter in turn being mounted on bar or lever 25 and adjustably secured in position as by screw 30ª, and cam 28 intermittently contacting with a roller 31 mounted on a finger 32 which is also mounted on slide bar 25 and adjustably secured as by screw 32ª.

It will be seen that when shafts 18 and 20 are rotated cam 19 will contact with roller 14 on lever 12 connected to pitman 15 and reciprocate or raise and lower spindle 9 and chuck 10, and brake cams 27 and 28 may be adjusted on shaft 18 to actuate lever or slide bar 25 in a lateral direction, to thereby impart a limited arcuate movement to brake lever 24 and cause said lever to raise and lower brake shoe 23, said shoe intermittently raising friction gear 21 secured on spindle 8 out of contact with similar gear 22, the latter preferably being a continuously driven member, and permitting said disk and spindle to lower by gravity assisted by auxiliary means such as springs, not shown, if desired, at which time friction gears 21 and 22 contact and impart rotation to spindles 8 and 9 and chuck 10, as will be readily understood by referring to Patent No. 1,655,431 above noted. By adjusting brake cams 27 and 28 on shaft 18, rotation may be imparted to the chuck at any time desired during reciprocation thereof.

The fulcrum point 13 of lever 12 may be adjusted or shifted while in operation and while the driving connection subsists by the assembly shown in detail in Figs. 6 and 7, this assembly preferably comprising a pivot or journal block 33, which is journaled in a longitudinal slotted portion of the lever or member to be fulcrumed or pivoted and bored and threaded for insertion of an adjusting screw 34, said block 33 being also mounted to shift or slide in a longitudinal slotted portion of a block or analogous member 35, which is adjustably secured to the frame or casting 5 of the machine as by screw bolts 36 and 37 and positioning pin 38, the frame 5 being arcuately slotted as at 37ª where the bolt 37 extends therethrough and a plurality of positioning holes 38ª provided in said frame for pin 38. By loosening bolts 36 and 37, pin 38 may be adjusted in any of said holes, to definitely locate or spot the angular position of the block 35 relatively to the frame and lever or other member to be pivoted or fulcrumed, while bolt 37 may be adjusted in slot 37ª to accomplish the same result independent of pin 38 and intermediate of holes 38ª. The adjusting screw 34 is journaled at opposite extremities of block 35 and provided with a thrust or bearing collar 34ª and handle 34ᵇ. It will be seen that by turning screw 34, journal block 33 may be shifted in the slotted portions provided therefor and thus shift the pivotal or fulcrum point of the lever or member to be pivoted or fulcrumed and vary the throw of said member or the extent of reciprocation thereof while in operation and while the driving connection subsists. By adjusting the angle of block 35, various advantageous results may be obtained. For instance, the extent of reciprocation may be varied without varying the lowermost point of reciprocation, or the extent of reciprocation may be varied without varying the uppermost point of reciprocation, or the altitude of reciprocation or intermediate point of reciprocation maintained constant while at the same time varying the extent of reciprocation, or the lowermost point of reciprocation may be varied to a greater or less extent than the uppermost point of reciprocation, and vice versa, or the altitude of reciprocation varied.

It is preferred to provide means for applying super or sub atmosphere to the mold, for the purpose, among other functions, of preventing displacement of the charge relatively to the mold during the jiggering or forming operation, and this construction may be readily understood by referring to my copending application Serial No. 170,613, heretofore noted. A longitudinal passage or bore 39 is provided in the spindle 8 and chuck 10 and preferably terminates in a vent 39ª formed in the body portion 11ᵇ of the mold 11. To regulate the application or introduction of super or sub-atmosphere to the bore 39, a valve, generally indicated at 40, is suitably secured to the extension 7 of the frame or casting 5, said valve being provided with a resiliently mounted plunger 41, said plunger being formed with ports 42 and 43, adapted to alternately register with ports 44 and 44ª formed in the valve casing, the port 44ª communicating with the bore 39 through pipe 44ᵇ, and port 44 having connected thereto a suitable flexible member or hose 45 leading to a source of sub-atmosphere. The port 43 in the plunger 41 opens into a chamber in which a suitable compression spring 46 is seated and this chamber may open into the atmosphere or be connected by a suitable flexible member or tube 47 with a source of air under pressure or super atmosphere. The plunger 41 is actuated by a cam 48, adjustably secured on shaft 18.

When the chuck is raised to thereby raise the mold through the medium of the mold-reciprocating mechanism heretofore described, the cam 48 contacts with and presses plunger 41 inwardly and causes port 42 to register with ports 44 and 44ª and thereby set up a sub-atmospheric condition in bore 39, and when plunger 41 is retracted by spring 46, ports 43 and 44ª register and permit application of air under pressure or super atmosphere to bore 39 or simply admit atmospheric air thereto, and any sub or super atmospheric condition set up in bore 39 will also be communicated to the underside of a plastic batch of clay or article of ware that may be disposed in or on the mold through vent 39a.

While the molds could be disposed on the chucks manually if desired and other parts of the structure herein disclosed manually operated without departing from the scope of the invention, the present structure is principally intended for use with automatic pottery fabricating mechanism wherein the molds are seated in carriers or trays as indicated at $a$ provided with bearing trunnions $a'$ whereby said trays may be connected in series in chains, a fragment of which is indicated at $a^2$, and supported on tracks, a fragment of which is indicated at $a^3$, the carriers or trays being shifted along said tracks over the chucks 10, which operate to intermittently or periodically elevate the molds from said carriers or trays and if desired also rotate same, to perform or assist in performing a fabricating operation, after which the molds are lowered onto the carriers and the latter shifted forward for another fabricating operation, an example of such conveying mechanism being disclosed in my patent No. 1,697,993, dated Jan. 8, 1929, and fabricating mechanism such as disclosed in my copending application Serial No. 215,615, filed Aug. 26, 1927.

It may be desirable in the present instance as well as during any prior of subsequent fabricating operation to positively or accurately spot or locate the angular position of rest of the plaster body 11ᵇ on the base 11ª of the mold and the mold on the tray and also on the chuck as well as to spot the angular position of the chuck relatively to the mold when elevating the mold from and lowering same onto the tray $a$, and with this end in view, the base 11ª of the mold is bored for insertion of positioning and centering pins 49 and 50, the pin 49 being adapted to engage seats or recesses 49ª and 49ᵇ respectively formed in the body 11ᵇ of the mold and chuck 10, and the pin 50 adapted to engage a recess or seat 50ª formed in the tray, when these parts are associated one with another, as will be more fully hereinafter explained. To spot the position of the chuck when the latter is lowered and consequently the position of the mold that may be carried thereby, a further positioning and centering pin 51 is adjustably threaded or otherwise secured to the frame 5 and retained in adjusted position as by locknut 51ª, said pin 51 being also adapted to engage in the recess or seat 49ᵇ formed in the chuck when the latter is lowered.

In operation, it will be seen that when the chuck is raised to engage and elevate and rotate the mold, pin 49 will engage in seat or recess 49ᵇ, and when the mold is lowered onto the tray, pin 50 will engage in seat or recess 50ᵃ and the mold will come to rest and remain in one position on the tray or be prevented from angular displacement preparatory to being again engaged by the same or another chuck, the latter lowering and rotating until pin 51 engages in seat or recess 49ᵇ, whereupon the chuck will come to rest and remain in one position or be prevented from angular displacement preparatory to being again raised to engage and rotate the mold or simply reciprocate the latter. Brake cams 27 and 28 may be adjusted on shaft 18 to permit friction gears 21 and 22 to engage and start rotation of the chuck at any time during elevation thereof and, conversely, to disengage said disks and stop rotation of said chuck, and this braking action may be regulated so as to gradually decelerate the rotation of the chuck and prevent jar or shock which might result from stopping the chuck too quickly when coming to rest.

The shaping tools and cooperating parts are attached to an upper movable frame assembly, the construction and operation of which is more fully described in my copending application Serial No. 203,186, filed July 2, 1927. Briefly, guide posts 52 are adjustably secured to and depend from a platform or cross brace structure 53, which is supported on the upper stationary frame 5ᵃ of the machine, said guide posts being adapted to guide and support a supplemental movable frame generally indicated at 54, which is vertically slidable on said posts, the lower ends of the latter being formed with stop heads 52ᵃ, which in some instances support the frame 54 when in its lowermost position and act as a stop for said frame. The lower part of the frame 54 is formed with a dove-tail groove and a bar 55 mounted to slide horizontally in said groove, said bar being formed with or having attached thereto at one extremity a bracket, which will be hereinafter referred to, which in the present instance serves to support a holder and guide, which will also be hereinafter described, through which an adjusting screw 56 is threaded. A lever 57 is pivoted at its lower extremity to the bar 55 and at its upper extremity adjustably pivoted as at 58, through the medium of the structure shown by Figs. 6 and 7, to the frame 54. The upper portion of the frame 54 is formed with a further dove-tail groove for slidably supporting a bar 59, also movable in a horizontal plane, said bar terminating a suitable distance from the one end of the groove, to provide a seat or recess for insertion of a suitable compression spring 60, adjustable through the medium of a screw 61, the bar 59 being adjustably maintained under longitudinal pressure by said screw and spring. A cam-contacting member or bracket 62 is secured to the bar 59, and to connect the bracket 62 and lever 57 in readily adjustable association, a turn-buckle 63 is pivotally secured to the bracket and lever, a plurality of securing holes 64 being formed in said bracket and lever so that the turn-buckle may be adjustably mounted thereon and adjusted at various elevations to adjust the throw of lever 57, and through the medium of the sliding block adjustment 58, degrees of throw intermediate of securing holes 64 may be obtained.

One preferred method of imparting vertical movement to the frame 54 and lateral movement to the bars 55 and 59 is to mount a cam shaft 65 in suitable bearings on the main stationary frame 5ᵃ, said shaft having adjustably secured thereon cams 66 and 67, the cam 66 being adapted to contact with the bracket 62 secured to the bar 59 and thus impart lateral movement to both bars 55 and 59, and the cam 67 contacting with a roller 68 rotatably mounted on a lever 69, adjustably pivoted at one extremity through the medium of the structure shown in Figs. 6 and 7, as at 70, to a bracket 71, which is secured to the stationary platform or cross brace structure 53 and at its opposite extremity said lever 69 is hingedly or pivotally connected to the frame 54 through the medium of a terminal bracket 72, threaded on a rod or bolt 73, extending through a lug or ear 74, an adjusting nut 75 being applied on said rod 73 below said lug 74 for adjusting, while in operation and while the driving connection subsists, the altitude of reciprocation of the frame 54. By adjusting the pivotal point 70, the extent of reciprocation of the frame 54 may be adjusted while in operation and while the driving connection subsists.

From the foregoing it will be seen that the frame 54 may be reciprocated vertically and the bars 55 and 59 laterally and also vertically with said frame, and any parts that may be attached to the frame and bars will have corresponding movements imparted thereto, and all parts of the supplemental frame assembly heretofore described are readily adjustable while in operation to vary the phase of such movements. The cam shaft 65 may be independently driven or connected with either of the lower shafts 18 and 20 by suitable flexible members and driven in timed relation therewith, or cams 66 and 67 may be loosened on shaft 65 and remain idle or removed therefrom and the mold only reciprocated vertically, or the frame and mold may be relatively reciprocated to bring the forming tools into operative adjacency to the ware, and it is preferred to adopt this latter course in the present instance in regard to said forming tools and tool-guiding instrumentalities, which will now be described.

The several shaping tools are primarily actuated by cam members generally indicated by 76 and 77 and shown in detail in Figs. 3 and 5, said members preferably being in the form of rings and removably secured on the outer annular peripheries of the mold base 11ª and chuck 10 as by screws 78 and 79. However, said members may be disposed in any other position to perform their several intended functions without departing from the scope of the invention, as will be obvious. These cam members 76 and 77 primarily control the shape which it is intended to give to the ware, and as a consequence, their working surfaces or contours will be governed by the particular character of ware being manufactured. A plurality of these cams are shown for the purpose of illustration, but one may be sufficient for forming the ware and in which event the remaining structures could be correspondingly reduced or simplified. In the present instance the cam member 76 is adapted to primarily actuate the shaping tools to form the ware shown as disposed in the mold in Figs. 1 and 2, and the cam member 77 the ware shown in the mold in Fig. 4, the ware being generally designated at A and B, or these cam members 76 and 77 may cooperate to form one piece of ware. As will be understood, the interior contour of the mold may be shaped in accordance with the exterior contour of the ware, while the shaping tools may be utilized to form the interior and top edge contour of deep ware and the bottom and edge of shallow ware. To adapt the cam ring 76 to the ware A particularly shown in plan view in Fig. 2, said ring has formed integrally therewith or removably attached thereto a peripheral raised part with a top surface depression, as at 76ª, which actuates the forming tools to form the spout 76ª' of the ware, and a series of top surface undulations or depressions, as at 76ᵇ, which actuates the forming tools to form the flutes 76ᵇ' in the ware. The smooth portion 76ᶜ' in the ware A is formed by a profile or shaping tool 82, which is secured to the frame 54 as will be hereinafter described. Cam ring 77 is formed with a series of undulations or wave-like portions on the outer peripheral and top surfaces thereof, as at 77ª, to primarily actuate the shaping tools to form the undulations or wave-like portions in the ware B as at 77ª'.

Shaping tools 80, 81, 82 and 83 are illustrated in the present instance, and it will be understood that any number of these tools may be employed and have varying shapes in accordance with the character of work involved. The tool 80 is adjustably secured to the bar 55 as at 80ª, the tool 81 to a holder or bracket member 84 as at 81ª, the tool 82 to the frame 54 as at 82ª, and the tool 83 to a holder 85 as at 83ª, each tool being universally adjustable through the medium of enlarged and slotted openings for the attaching screws or bolts therefor. Cam contacting members 86, 87, 88, 89, 90, 91 and 91' are provided and adjustably secured to holders and guides 92, 93, 94 and 95 as by screws 86ª, 87ª, 88ª, 89ª, 90ª, 91ª and 91ᵇ, holders 92 and 93 being respectively mounted on the bar 55 and frame 54 as by brackets 96 and 97, upper and lower collars 98 and 99 being adjustably threaded on the upper extremities of said holders 92 and 93 above and below said brackets and compression springs 100 being interposed between the brackets and lower collars, so that the cam contacting members 86, 87, 88 and 89 may be adjustably maintained in contact with either or both cam rings 76 and (or) 77 when adjusted on holders 92 and 93 against said rings. Shaping tool holders 84 and 85 are adjustably secured to holders 92 and 93 as by screws 84ª and 85ª. Guide member 94 also serves as a holder for cam-contacts 90 and 91 while the member 95 simply serves as a guide, the member 94 being secured to bar 55 and the member 95 to the frame 54. Auxiliary guide brackets 101 and 102 are adjustably secured to the guides 94 and 95 as by screws 101ª and 102ª.

As heretofore indicated, upper and lower shafts 65 and 18 may be driven in synchronism, and for this purpose these shafts may be provided with positive power transmission means such as driving sprockets and connected by a chain or similar flexible member as at 103.

It may be desirable in some instances to mount the chuck resiliently so that the cam contacting members depress the chuck or cause the latter to reciprocate vertically as the chuck rotates instead of reciprocating the forming tools, in which event a spring Y may be applied around the chuck spindle 9 in the necked portion thereof above fork 16 and collars 98 and 99 adjusted on holders 92 and 93 relatively to brackets 96 and 97 so as to maintain the forming tools rigid, or spring 100 may be removed. Fork 16 may be adjusted through the medium of nuts 17 to limit the uppermost point of reciprocation of the chuck when the latter is mounted resiliently.

Fig. 8 illustrates a preferred method of mounting a trimmer so that the latter will automatically operate subsequent to formation of the ware by the forming tools, it being preferred to provide a separate frame assembly for the trimmer which may be substantially similar to that shown at the upper portion of Fig. 1 and mounted adjacent thereto and actuated primarily from cam shaft 65. The trimmer, indicated at 105, is mounted on a bracket holder 106, this mounting being substantially similar to the mounting of the tool 81, heretofore described, said holder 106 being in turn adjustably secured to a further holder 92ª as by screw 106ª and slidable on guide member 94ª, holder 92ª and guide 94ª being secured to bar 55 as by bracket 96ª and holder 92ª being resiliently mounted as by spring 100ª and adjustable as by collar 98ª. Holder 92ª and guide 94ª may extend downwardly and are provided with cam contacts in a manner substantially similar to holder 92 and guide 94 as illustrated in Fig. 1, so that the trimmer will be caused to follow the contour of the edge of the ware by the cam members which primarily actuate the forming tools and examples of which are illustrated in detail in Figs. 3 and 5. The frame in Fig. 8 is vertically reciprocated by cam 67ª and the bar 55 by cam 66ª, these cams preferably being contoured and so timed on shaft 65 as to lower the trimmer 105 into engagement with the mold and ware immediately after the forming tools that may be used shall have completed their work, and such dwell portions provided on said cams as will maintain the trimmer in operative position during at least one complete revolution of the mold. As shown in Fig. 8, the trimmer is in retracted position, cams 66ª and 67ª at this time maintaining the trimmer raised and moved laterally to the left out of contact with the mold and ware.

The operation of the improved machine should be obvious in view of the drawings and foregoing description. The clay may be fed to the molds either manually or automatically and the molds conveyed on carriers or trays a or disposed directly on the chuck 10. However, it is preferred to use the present structuer in conjunction with automatic conveying mechanism, as hereinbefore noted, and as the trays bearing the molds with the unformed clay therein are shifted over the chucks, the latter may be operated in timed relation to the conveying mechanism by adjusting cam 19 on shaft 18 and through other adjustments which may be understood by referring to my copending application heretofore specified to rise and contact with and elevate the molds from the trays and rotate same, and frame cams 66 and 67 adjusted on shaft 65 to lower and, if necessary or found desirable, move the forming tools laterally into operative adjacency to the ware in or on the mold, and at which time a sub-atmospheric condition may be set up in bore 39 by properly timing and adjusting cam 48 on shaft 18 relatively to valve 40, to thereby maintain the clay in stable position in or on the mold and, among other functions, prevent slippage of the batch of clay while being operated on by the forming tools and also serve to hold the mold firmly on the chuck. In the production of certain types of ware, it may be essential to have the mold maintained in one position on the tray so as to be properly centered for the chuck when the latter rises to engage the mold and to also come to a definite position of rest when lowered onto said tray for further operations, and by centering the mold on the chuck and the mold body on the base thereof, the unformed ware may be brought to a definite point for operation thereon by the forming tools, and during the forming operation, maintained in a definite angular position relatively to said tools, so that any flutes, spouts, etc., to be formed in the ware will be uniform in each and every article produced. The frame 54 and bars 55 and 59 may be adjusted to the desired point and permitted to have what may be considered a floating action, and as said laterally movable bars 55 and 59 and holders 92 and 93 are under adjustable spring tension, the various cam-ring-following members directly or indirectly attached thereto may be maintained in contact with cam rings 76 and 77 if so desired, or screw 56 and collars 98 may be adjusted to permit contact with only a part of the surface area of said cams, to thereby regulate, while in operation, the depth of any flutes or other configurations that may be formed in the ware. As the mold is rotated, the forming tools will be guided in accordance with the particular cam in use and which may be applied to the mold base or chuck, or both. When cams are applied to the chuck, care should be taken to attach same at such points on the chuck as will permit sufficient elevation of the latter without the cam striking the tray. To form the ware A, cam-contacting members 90 may be adjusted to impart vertical movement to the tool 80, and cam-contacting members 91 lateral movement to said tool, which if used in conjunction with cam ring 76 would form the spout 76ª' of the ware A, while cam-contacting member 87 is adapted to guide tool 83, the profile or tool 82 being controlled and regulated preferably by adjusting the frame 54, the mold rotating in operative adjacency to said profile 82 forming the smooth portion 76ᶜ' in the ware. It is preferred to adjust cams 67 and 67ª on shaft 65 so that the forming-tool frame 54 is lowered and dwells until the mold is rotated sufficiently to form the ware and the trimmer frame, also designated 54, lowered to bring the trimmer into operative position while the forming-tool frame is being raised and the mold is still rotating, cams 66 and 66ª being also adjusted on shaft 65 to impart the required lateral movement to the forming tools and trimmer if such movement is required to bring these members into operative position, the mold then being lowered onto the tray upon completion of the trimming operation and shifted forward and another mold bearing an unformed charge shifted in position under said frames and shaping tools and trimmer. In the event it is desired to form the ware indicated at B, the cam-ring-contacting members 88 and 89 may be adjusted to contact with the top surface of cam ring 77, and cam-ring-contacting member 91' adjusted to contact with the peripheral surface of ring 77.

In the event it is desired to produce ware having an odd or individual shape in a regular line or group of similarly shaped ware, this may be done simply by associating or attaching the regular working cam to the chuck and providing the mold or molds bearing the unformed ware or clay to be given the odd or individual shape with a cam having its working surface extended beyond the plane of the working surface of the cam on the chuck. Then by adjusting cam contacts 88, 89 and 91' to normally contact with the working surface of the chuck cam and contacts 86, 87, 90 and (or) 91 to contact with the working surface of the mold cam, it will be seen that when a mold having a cam with a working surface extended beyond the working surface of the cam on the chuck is engaged by said chuck, contacts 88, 89 and 91' will be held clear of the chuck cam and contacts 86, 87, 90 and (or) 91 then actuate the forming tools through contact with the mold cam until the ware is formed and the mold replaced by a mold which bears no cam or a cam having a working surface below the plane of the working surface of the chuck cam.

Excess material may be removed from the mold in any desired manner, but it is preferred to remove such material automatically by adopting the structure illustrated and described in my copending application Serial No. 159,143, filed Jan. 5, 1927, fragments of which are indicated at 104 and 104'.

It is obvious that the top of the mold could be constructed to function in a manner similar to cam rings 76 and 77, or as a guide for the forming tools, and contact directly with an extension of the latter or with contacts 86, 87, 90 and 91, and numerous other structural changes and adaptations made without departing from the scope of the invention.

What is claimed as new is:

1. In a pottery forming machine, a reciprocating and rotating chuck, a mold adapted to be supported by said chuck, and means for spotting the angular position of said mold relatively to said chuck.

2. In a pottery forming machine, a reciprocating and rotating chuck, a mold-carrying tray, a mold adapted to be alternately supported by said chuck and tray, and a means for spotting the angular position of said mold relatively to said chuck and said tray.

3. In a pottery forming machine, a reciprocating and rotating chuck, a mold adapted to be supported by said chuck, said chuck and mold being provided with cooperating male and female members for positioning said mold on said chuck and maintaining the mold and chuck in horizontal and vertical alinement.

4. In a pottery forming machine, a chuck, a mold adapted to be supported by said chuck and comprising a porous body member and metal base member, and cooperating male and female members for positioning said mold on said chuck and said body member on said base member, said members also serving to maintain said chuck and mold and body member and base member in positive angular association.

5. In a pottery forming machine, a reciprocating and rotating chuck, a mold carrier, a mold adapted to be alternately supported by said chuck and carrier, said mold and carrier being provided with cooperating male and female members for positioning said mold on said chuck and on said carrier, said members also serving to prevent relative angular displacement of said mold while supported by said chuck and said carrier.

6. In a pottery forming machine, a stationary frame, a chuck, means for reciprocating and rotating said chuck, said chuck and frame being provided with cooperating male and female members for spotting the angular position of rest of said chuck relatively to said frame.

7. In a pottery forming machine, a chuck, means for reciprocating and rotating said chuck, a mold carrier, a mold comprising separably associated body and base members, said mold being adapted to be alternately supported by said chuck and said carrier, and a means for spotting the angular position of the mold on the chuck and carrier and mold body on its base and also the angular position of rest of said chuck.

8. In a pottery forming machine, a chuck, a mold adapted to be intermittently supported by said chuck, means for reciprocating and rotating the chuck to engage and rotate the mold, the chuck being provided with a bore and the mold with a pin adapted to register with said bore to spot the angular position of the mold when engaged by the chuck.

9. In a pottery forming machine, a chuck, a tray, a mold adapted to be alternately supported on said chuck and said tray, means for reciprocating and rotating the chuck to engage and rotate the mold, the chuck and tray being bored and the mold provided with pins adapted to alternately register with said bores to spot the angular position of the mold when supported on said chuck and said tray.

10. In a pottery forming machine, a mold, a chuck, means for reciprocating and rotating said chuck to engage and rotate the mold, shaping tools movably mounted in operative adjacency to the mold, cam means secured on the annular periphery of the mold and (or) chuck and adapted to primarily actuate said shaping tools, and means for introducing a fluid medium to the mold.

11. In a pottery forming machine the combination with a mold having a charge of plastic material therein or thereon, of a reciprocating and rotating chuck adapted to engage and rotate the mold, shaping tools movably mounted in operative adjacency to the mold, cam means secured on the annular periphery of the mold and (or) chuck, said cam means operating to primarily actuate said shaping tools to form the plastic charge, and means for establishing a sub-atmospheric condition between the mold and charge of plastic material.

12. In a pottery forming machine, a mold, a chuck, means for reciprocating and rotating said chuck reciprocably mounted shaping tools, cam means associated with said mold and (or) chuck for reciprocating said shaping tools, and adjustable lever means for regulating the reciprocation of said shaping tools independent of said cam means.

13. In a pottery forming machine, a mold, a chuck, means for reciprocating and rotating said chuck, reciprocably mounted shaping tools, cam means associated with said mold and (or) chuck for reciprocating said shaping tools, and adjustable lever means for regulating while in operation the reciprocation of said shaping tools independent of said cam means.

14. In a pottery forming machine, a mold, a chuck, means for reciprocating and rotating said chuck and mold, reciprocably mounted shaping tools, cam means associated with said mold and (or) chuck for reciprocating said tools during the shaping operation, and means synchronized with the chuck reciprocating and rotating means for moving said tools into operative position.

15. In a pottery forming machine, a mold, a chuck, means for reciprocating and rotating said chuck and mold, a reciprocably mounted frame, shaping tools mounted on said frame, cam means associated with said mold and (or) chuck for reciprocating said tools during the shaping operation, and means synchronized with the chuck reciprocating and rotating means for actuating said frame to move said tools into and out of operative position.

16. In a pottery forming machine, in combination, a plurality of molds, a chuck adapted to intermittently support the molds, reciprocably mounted shaping tools, individual cams on said molds adapted to control the motion of said tools, and means for conveying the molds successively into operative position relatively to said chuck and said tools, whereby individual shapes and contours may be imparted to each article of ware without changing chucks or tools.

Signed by me this 12th day of October, 1927.   WILLIAM J. MILLER.